(12) United States Patent
Lurken et al.

(10) Patent No.: US 9,186,958 B2
(45) Date of Patent: Nov. 17, 2015

(54) METHOD FOR THE REFRIGERATED TRANSPORTATION OF A STOCK IN A VEHICLE IMPLEMENTING A LIQUID COMBUSTIBLE GAS TANK AND A LIQUID NITROGEN TANK

(75) Inventors: Franz Lurken, Kempen (DE); Helmut Henrich, Pulheim (DE)

(73) Assignee: L'Air Liquide Société Anonyme Pour L'Étude Et L'Exploitation Des Procedes Georges Claude, Paris (FR)

(*) Notice: Subject to any disclaimer, the term of this patent is extended or adjusted under 35 U.S.C. 154(b) by 311 days.

(21) Appl. No.: 13/697,945

(22) PCT Filed: Apr. 22, 2011

(86) PCT No.: PCT/EP2011/056489
§ 371 (c)(1),
(2), (4) Date: Nov. 14, 2012

(87) PCT Pub. No.: WO2011/141286
PCT Pub. Date: Nov. 17, 2011

(65) Prior Publication Data
US 2013/0061608 A1 Mar. 14, 2013

(30) Foreign Application Priority Data
May 14, 2010 (DE) .......................... 10 2010 020 476

(51) Int. Cl.
*B60H 1/32* (2006.01)
*F17C 6/00* (2006.01)
*F17C 9/00* (2006.01)

(52) U.S. Cl.
CPC ................ *B60H 1/3202* (2013.01); *F17C 6/00* (2013.01); *F17C 9/00* (2013.01);
(Continued)

(58) Field of Classification Search
CPC ............ B60H 1/3202; F17C 7/02; F14C 6/00
USPC .............................................. 62/5, 7, 9, 440
See application file for complete search history.

(56) References Cited

U.S. PATENT DOCUMENTS 2,592,712 A * 4/1952 Knoy ............................... 62/101
2,724,245 A * 11/1955 Swinburne ...................... 62/278
(Continued)

FOREIGN PATENT DOCUMENTS

DE 24 38 195 2/1976
DE 19531122 A1 * 2/1997 ............... B60H 1/32
(Continued)

OTHER PUBLICATIONS

International Search Report for PCT/EP2011/056489, mailed Jul. 14, 2011.

*Primary Examiner* — Emmanuel Duke
(74) *Attorney, Agent, or Firm* — Christopher J. Cronin

(57) ABSTRACT

The present invention relates to a supply station jointly storing a low-temperature-liquefied combustible gas, in particular natural gas, and liquid nitrogen and designed for supplying each component separately or jointly as needed to a vehicle, the supply station being present on the vehicle, the station comprising at least a first storage tank for storing said liquefied combustible gas; and at least a second storage tank for storing said liquid nitrogen and at least one heat-transmitting connection element between the at least one first storage tank and the at least one second storage tank, which connection element is designed so that the combustible gas can be cooled, or can be maintained at a temperature below its boiling point, directly or indirectly by the liquid nitrogen.

19 Claims, 4 Drawing Sheets

(52) U.S. Cl.
CPC .............. *F17C 2201/0109* (2013.01); *F17C 2203/0308* (2013.01); *F17C 2203/0391* (2013.01); *F17C 2205/0134* (2013.01); *F17C 2205/0149* (2013.01); *F17C 2205/0326* (2013.01); *F17C 2205/0332* (2013.01); *F17C 2221/014* (2013.01); *F17C 2221/033* (2013.01); *F17C 2223/0161* (2013.01); *F17C 2223/033* (2013.01); *F17C 2227/0135* (2013.01); *F17C 2227/0341* (2013.01); *F17C 2227/0374* (2013.01); *F17C 2227/0379* (2013.01); *F17C 2227/0383* (2013.01); *F17C 2227/0393* (2013.01); *F17C 2227/0395* (2013.01); *F17C 2250/043* (2013.01); *F17C 2250/0439* (2013.01); *F17C 2250/0626* (2013.01); *F17C 2250/0631* (2013.01); *F17C 2250/0636* (2013.01); *F17C 2250/072* (2013.01); *F17C 2265/025* (2013.01); *F17C 2265/033* (2013.01); *F17C 2270/0136* (2013.01); *F17C 2270/0168* (2013.01); *F17C 2270/0171* (2013.01)

(56) References Cited

U.S. PATENT DOCUMENTS

| | | | |
|---|---|---|---|
| 3,316,726 A * | 5/1967 | Pauliukonis | 62/52.1 |
| 3,421,336 A * | 1/1969 | Lichtenberger et al. | 62/52.1 |
| 3,640,337 A * | 2/1972 | McJones | 165/202 |
| 3,802,212 A * | 4/1974 | Martin et al. | 62/50.2 |
| 3,803,859 A * | 4/1974 | Kleffmann et al. | 62/52.1 |
| 3,878,689 A * | 4/1975 | Grenci | 62/614 |
| 5,313,787 A * | 5/1994 | Martin | 62/222 |
| 5,315,831 A * | 5/1994 | Goode et al. | 62/611 |
| 5,320,167 A * | 6/1994 | Johnson et al. | 165/64 |
| 5,415,001 A * | 5/1995 | Powars | 62/50.2 |
| 5,715,685 A * | 2/1998 | Takasugi | 62/52.1 |
| 6,062,030 A * | 5/2000 | Viegas | 62/175 |
| 8,020,407 B2 * | 9/2011 | Viegas | 62/613 |
| 2002/0129613 A1 * | 9/2002 | Viegas et al. | 62/239 |
| 2003/0019219 A1 * | 1/2003 | Viegas et al. | 62/50.2 |
| 2003/0029179 A1 * | 2/2003 | Vander Woude et al. | 62/201 |
| 2010/0050660 A1 * | 3/2010 | Teegen et al. | 62/45.1 |
| 2010/0139297 A1 * | 6/2010 | McCormick et al. | 62/89 |

FOREIGN PATENT DOCUMENTS

| | | | | |
|---|---|---|---|---|
| DE | 196 20 653 | | 6/1997 | |
| EP | 0 788 908 | | 8/1997 | |
| EP | 0788 906 | | 8/1997 | |
| EP | 1 046 858 | | 10/2000 | |
| GB | 2 275 098 | | 8/1994 | |
| GB | 2275098 A | * | 8/1994 | ............... F25D 3/10 |

* cited by examiner

METHOD FOR THE REFRIGERATED TRANSPORTATION OF A STOCK IN A VEHICLE IMPLEMENTING A LIQUID COMBUSTIBLE GAS TANK AND A LIQUID NITROGEN TANK

CROSS-REFERENCE TO RELATED APPLICATIONS

This application is a §371 of International PCT Application PCT/EP2011/056489, filed Apr. 22, 2011, which claims §119(a) foreign priority to German patent application 10 2010 020 476.5, filed May 14, 2010.

BACKGROUND

1. Field of the Invention

The present invention relates to a method and an apparatus for the joint storage and/or transfer and/or transportation of low-temperature liquefied combustible gas, in particular natural gas, and of liquid nitrogen and also to uses of the method and of the apparatus.

2. Related Art

It is known to operate internal combustion engines of motor vehicles with natural gas. The natural gas is carried, either under pressure or in low-temperature liquefied form, in special storage tanks in the motor vehicle. In the latter case, the liquid natural gas has a temperature of at most −161° C. at atmospheric pressure, and part of the natural gas may constantly evaporate on account of the heat supplied by the surroundings. Evaporation is undesirable, especially when the motor vehicle is not in operation. The gaseous part of the natural gas mainly contains the more volatile constituents of the gas which have a higher vapour pressure or a lower boiling temperature. The extraction of part of the natural gas present in gaseous form in the storage tank leads, in the long term, to an enrichment of higher hydrocarbons, in particular propane, in the low-temperature liquefied part of the natural gas. The high propane gas fraction may be harmful for an internal combustion engine, when later supplied to it. Moreover, the mixture composition changes with time, this being undesirable. In an extreme case, the higher hydrocarbons may also freeze out of the solution.

In refrigeration vehicles operated with natural gas, which have a refrigeration space for the transport of refrigerated stock, it is known from EP 0 788 908 A2 to utilize the evaporation energy of the natural gas to keep the refrigeration space at a low temperature. The gaseous natural gas is subsequently supplied to an internal combustion engine designed for natural gas. At times when the vehicle is not being operated, but the refrigeration space has to be kept cold, the refrigeration space is cooled conventionally, in which case the conventional cooling engine may, in turn, be driven by natural gas. Among other things it is disadvantageous that the natural gas itself needs to be conducted all the way from a natural gas tank mostly close to the combustion engine to the cooling unit, usually arranged in or close to the refrigeration space, which implies a lot of risks according to the flammable properties of the natural gas in case of defects like leakages in the supplying fuel lines. Moreover, especially the use of such a cooling method in a trailer truck is only applicable quite limited, because no appropriate, workable systems for disconnecting fuel lines, which would be necessary in case of decoupling a trailer from a tractor, are available. Therefore the refrigeration space of a trailer in a trailer truck usually is cooled by liquid nitrogen or by conventional compressor cooling methods solely, even if the tractor is driven by natural gas.

Evaporating natural gas also represents a problem at filling stations which make liquid natural gas available for natural-gas-operated vehicles. According to the prior art, the evaporated gaseous natural gas is compressed in a complicated way at the filling stations and may be used further, where appropriate, in gaseous form. However, here too, the result of the constantly evaporating natural gas is that the liquid natural gas still contained in the tank is enriched after some time with higher hydrocarbons, in particular propane, since the constituents having a lower boiling point evaporate sooner. The rising propane fraction may, beyond certain limits, constitute a problem for natural-gas-operated internal combustion engines.

SUMMARY OF THE INVENTION

The object of the present invention, therefore, is to at least partially solve the problems known from the prior art and, in particular, to specify a method and an apparatus which make it possible to store combustible gases at low temperature, without evaporating fractions of these being discharged into the atmosphere, and to minimize the enrichment of higher-boiling fractions in mixtures of combustible gases, in particular of propane in low-temperature liquefied natural gas. Thus, in particular, low-temperature liquefied combustible natural gas is to be stored and transported more efficiently.

These objects are achieved by means of a method according to the features of claim 1, an apparatus according to the features of claim 11 and use of the apparatus according to the invention according to the features of claim 22. Further advantageous refinements of the invention are specified in the dependently formulated claims. It should be pointed out that the features listed individually in the claims and the description may be combined with one another in any technologically expedient way and define further refinements of the invention. Furthermore, the features specified in the claims are more precisely detailed and explained and further preferred embodiments of the invention are illustrated in the drawing.

The object is achieved, in particular, by means of a method for the joint storage and/or transportation of low-temperature liquefied combustible gas, in particular natural gas, and of liquid nitrogen, the low-temperature liquefied gas being cooled or kept cool directly or indirectly by the liquid nitrogen.

Liquid nitrogen has a boiling temperature of at most −196° C. at normal pressure and can also cool in the liquid phase low-temperature liquefied combustible gas having a higher boiling temperature of all the constituents than −196° C. There is a theoretical possibility of cooling the low-temperature liquefied combustible gas by directly supplying it with liquid and/or gaseous nitrogen. It is preferable, however, to discharge heat indirectly from the low-temperature liquefied combustible gas, in that liquid and/or gaseous nitrogen or a heat transfer medium is supplied in a pipeline system to the low-temperature liquefied combustible gas, so that heat transmission takes place indirectly via the pipeline system.

The direct or indirect cooling prevents the low-temperature liquefied combustible gas from evaporating unintentionally due to the supply of heat from the surroundings. Loss-free storage of a low-temperature liquefied combustible gas is thus made possible. This affords the further advantage that the low-temperature liquefied combustible gas preserves its composition of different components and is not enriched with less volatile constituents which have a higher boiling point.

By virtue of the development of the method according to the invention whereby the nitrogen and/or the combustible gas is employed cooling a refrigeration space directly or indirectly, higher energy efficiency in the use of low-temperature liquefied combustible gases and of liquid nitrogen is achieved. If the low-temperature liquefied combustible gas has to be present in gaseous form for further use, the evaporation energy can be employed in the phase transformation from liquid to gaseous in order to cool a refrigeration space. At times when the combustible gas is not required for further use in the gaseous state, the liquid nitrogen may be employed for cooling the refrigeration space and for cooling a stock of combustible gas. The advantage of this is that nitrogen can be discharged harmlessly into the environment, in contrast to most combustible gases. A synergy effect is achieved from the combination of the cooling of low-temperature liquefied combustible gas by liquid nitrogen and the use of both gases for cooling a refrigeration space. This effect can be employed particularly in refrigeration transporters which are driven by means of natural gas and the refrigeration space of which is cooled mainly by nitrogen.

In the method according to the invention, it is advantageous, furthermore, if the combustible gas is supplied to an internal combustion engine. The combustible gas can thus be employed both for cooling a refrigeration space and for operating an internal combustion engine. When the internal combustion engine is in operation, the low-temperature liquefied gas is first employed, during phase transformation, for cooling the refrigeration space, before it is supplied to the internal combustion engine. If the internal combustion engine is not in operation, the liquid nitrogen is employed for cooling the refrigeration space and a stock of combustible gas.

This gives rise to an energy-advantageous and environmentally advantageous use of low-temperature liquefied combustible gas and of liquid nitrogen.

It is especially advantageous if the heat extracted from the low-temperature liquefied combustible gas is regulated. Regulation of the heat extracted from the low-temperature liquefied combustible gas takes place, in particular, via a regulation of the quantity and/or phase state of the liquid and/or gaseous nitrogen or a heat transfer medium supplied to the low-temperature liquefied combustible gas. The temperature of the low-temperature liquefied combustible gas should in this case be selected at least so that the vapour pressure lies at least 0.5 bar, preferably 2 bar, below the response pressure of a conventional tank excess-pressure safety device. In this case, regulation should be configured so that a minimum pressure necessary, where appropriate, for its extraction and use is not undershot in the storage tank.

The method according to the invention can be carried out especially efficiently when heat from the low-temperature liquefied combustible gas is transmitted to the nitrogen via at least one heat exchanger.

According to a further aspect of the invention, an apparatus for the joint storage and/or transportation of low-temperature liquefied combustible gas, in particular natural gas, and of liquid nitrogen is proposed, comprising at least one first storage tank for low-temperature liquefied combustible gas, at least one second storage tank for liquid nitrogen and at least one heat-transmitting connection element between the at least one first storage tank and the at least one second storage tank, which connection element is designed so that the at least one first storage tank can be cooled directly or indirectly by the liquid nitrogen. The apparatus according to the invention can be used, in particular, for carrying out the method according to the invention.

The first storage tank and the second storage tank are, as a rule, cryotanks, known from the prior art, which, by virtue of their construction, are designed, in terms of the materials and heat insulation used, to be capable of storing low-temperature liquefied combustible gas or liquid nitrogen with as low a loss as possible. The insulation is usually designed as a high-vacuum space with radiation protection. In such storage tanks, the liquefied gases can normally be stored under a certain pressure, and, in the event of too high a pressure rise on account of evaporating low-temperature liquid, a safety valve allows part of the gaseous gas to escape.

The heat-transmitting connection element may be designed as a line system which introduces liquid nitrogen directly into the first storage tank, in order there to achieve a direct cooling of the low-temperature liquefied combustible gas. This may, however, lead to an unwanted nitrogen atmosphere above the low-temperature liquefied gas inside the first storage tank. It is therefore advantageous to route the liquid nitrogen solely in a line system through the first storage tank, so that heat transmission from the low-temperature liquefied combustible gas to the line system and therefore indirectly to the nitrogen takes place, while, depending on the prevailing conditions, the nitrogen is present in gaseous and/or liquid form in the line system or can change its state of aggregation in the line system. However, the connection element may also be implemented in that the first storage tank and the second storage tank are arranged with respect to one another by means of a mechanical connection so that the cooling of the low-temperature liquefied gas takes place by the conduction of heat via the envelope or other components of the first storage tank and/or of the second storage tank to the liquid nitrogen. For this purpose, the two tanks are preferably installed in a common vacuum space.

On account of the transmission of heat from the low-temperature liquefied combustible gas to the nitrogen, what can be achieved, according to the invention, is that the low-temperature liquefied combustible gas is constantly cooled so that the low-temperature liquefied combustible gas does not evaporate due to the additional introduction of heat from the surroundings. Owing to the transmission of heat from the low-temperature liquefied combustible gas to the liquid nitrogen, only the latter evaporates and is at least partially in gaseous form. The still cold gaseous nitrogen may be employed for cooling further refrigeration spaces and may subsequently be routed to the atmosphere or employed elsewhere, for example for inertization. It is perfectly safe to discharge nitrogen into the free ambient air.

The situation is therefore avoided where the combustible gas occurs in gaseous form in large quantities and has to be collected and stored in a complicated way. Moreover, the situation is also avoided where an enrichment of the low-temperature liquefied combustible gas by less volatile constituents, such as, for example, propane in natural gas, occurs. In addition, a virtually loss-free storage of the low-temperature liquefied combustible gas is achieved.

In a development of the apparatus according to the invention, the first storage tank and the second storage tank are arranged in a common insulating jacket. The insulating jacket is designed so that the low-temperature liquefied gas in the first storage tank and the liquid nitrogen in the second storage tank are thermally insulated with respect to the surroundings. The first storage tank and the second storage tank may be arranged with respect to one another inside the insulating jacket so that a transmission of heat from the low-temperature liquefied gas to the liquid nitrogen via the envelope of the first storage tank and/or via the envelope of the second storage tank is made possible by heat conduction. In addition, a line system for the transfer of heat from the low-temperature liquefied combustible gas to the nitrogen may be provided. In the case where no additional line system is provided, the insulating jacket may be considered as a connection element which allows a transmission of heat from the low-temperature liquefied gas to the liquid nitrogen. By the first storage tank and the second storage tank being arranged in a common insulating jacket, the apparatus according to the invention is made available in a compact system. In a version of the two storage tanks in direct thermal contact, care must be taken to ensure that the pressure of the nitrogen is selected so that its temperature sets the pressure of the combustible gas to a desired pressure by means of its vapour-pressure line.

Furthermore, it is advantageous if the second storage tank is arranged in the first storage tank. In such an arrangement, there is no need for a further line system connecting the first storage tank and the second storage tank to one another. Instead, the connection element is in this case the mechanical connection device between the first storage tank and the second storage tank. When the first storage tank is arranged in the second storage tank, the first storage tank is constantly maintained at the temperature of the liquid nitrogen by the liquid nitrogen contained in the second storage tank. Evaporation of the low-temperature liquefied combustible gas in the first storage tank therefore does not take place. Only the liquid nitrogen contained in the second storage tank evaporates due to the supply of heat from the surroundings and can be discharged into the atmosphere. By the first storage tank being arranged in the second storage tank, a compact system is made available, while thermal insulation has to be arranged only outside the second storage tank.

It is advantageous if the connection element has at least one heat exchanger. By a heat exchanger being used, the transmission of energy from the low-temperature liquefied combustible gas to the nitrogen can take place especially efficiently. A first heat exchanger, through which the low-temperature nitrogen is routed, may be provided in the first storage tank. By means of the first heat exchanger, efficient heat transmission from the low-temperature liquefied combustible gas to the low-temperature nitrogen takes place.

However, a first heat exchanger can also be arranged in the first storage tank and a second heat exchanger in the second storage tank, a heat transfer medium circulating between the first heat exchanger and the second heat exchanger. A heat transfer medium is preferably employed which still remains flowable even at temperatures of liquid nitrogen and which has a boiling point of markedly above 50° C. The lower temperature at which the heat transfer medium is still to be usable is determined by the second heat exchanger which is assigned to the liquid nitrogen. In this case, however, concepts are also known in which heat transfer medium freezes out in a layer on the walls of the heat exchanger tubes, the transmission of heat to the liquid nitrogen is thereby reduced and a flow of the heat transfer medium having a somewhat higher temperature is thus maintained inside the cooling tubes. The heat transfer medium is mostly commercially available oils and the like.

It is likewise advantageous if the connection element has at least one valve, in particular a controllable valve. With the aid of a valve, the quantity of low-temperature nitrogen or the quantity of heat transfer medium supplied to the first storage tank can be influenced. The heat quantity which is extracted from the low-temperature liquefied combustible gas can thus be influenced.

It is especially advantageous if the apparatus is equipped with a regulation unit for regulating the temperatures and/or pressures in the first storage tank and/or in the second storage tank. The regulation unit may be connected to measuring instruments for monitoring the temperature and/or the pressure in the first storage tank and/or in the second storage tank. Furthermore, the regulation unit may be connected to the controllable valves and thus regulate the desired operating parameters. In particular, the quantity of evaporated or liquid nitrogen or heat transfer medium which is supplied to the first storage tank can be regulated in order to set a desired temperature of the low-temperature liquefied combustible gas and/or to regulate the pressure in the first storage tank. The temperature in the first storage tank should be regulated so that a temperature of below −161° C. is present in the first storage tank, in order to prevent an evaporation of the low-temperature liquefied combustible gas. However, settings are also possible in which a storage tank is kept below a specific stipulated pressure, with the result that the boiling points of the contents are higher and an extraction of combustible gas and/or nitrogen is facilitated. When the present invention is employed, combustible gas required is preferably extracted from the liquid phase, that is to say an outlet is provided in the first storage tank at the bottom.

According to a further aspect of the invention, the apparatus according to the invention can be used in a refrigeration vehicle, comprising an internal combustion engine. The combustible gas can be supplied to the internal combustion engine from the first storage tank, after a phase transition from the liquid to the gaseous phase. The liquid nitrogen can be employed for cooling a refrigeration space. In particular, the apparatus according to the invention is employed in the refrigeration vehicle for carrying out the method according to the invention.

In the present case, it is especially expedient that, by virtue of the method, the evaporation enthalpy of the liquid nitrogen is utilized for cooling the fuel gas. At the same time, however, about 50% of the available cold still remains in the gas phase of the nitrogen. This cold may be used directly for cooling the vehicle. 100% of the energy of the nitrogen is thus also utilized.

In refrigeration vehicles known from EP 0 788 906 A2, the combustible gas, on the one hand, is employed for cooling the refrigeration space and, further, is supplied to the internal combustion engine. Thus, the refrigeration space is cooled and the internal combustion engine is driven. If, however, the internal combustion engine is not in operation, a conventional cooling of the refrigeration space is required. Although this cooling may be driven by the combustible gas, there is no assurance that no more combustible gas evaporates than is required for cooling. This would then have to be burnt uselessly in the refrigeration assembly or otherwise, be supplied to the atmosphere or intermediately stored, which is scarcely practicable. No expedient solution is described for standstill times of a vehicle which is filled with low-temperature liquefied natural gas and does not require cooling.

In the use according to the invention in a refrigeration vehicle, the liquid nitrogen is employed for cooling the low-temperature liquefied combustible gas, so that the latter does not evaporate on account of the supply of heat from the surroundings. Furthermore, the liquid nitrogen may be employed, as required, for cooling the refrigeration space, especially at times when the refrigeration vehicle is not being moved, but the refrigeration space is to be cooled. Thus, when the internal combustion engine is at a standstill, only nitrogen is employed for cooling the refrigeration space and is conducted into the atmosphere. The low-temperature liquefied combustible gas is cooled by the nitrogen during this time so that it does not evaporate. From the interaction of low-temperature liquefied combustible gas and liquid nitrogen, a synergy effect is achieved, and environmental pollution caused by natural gas which possibly escapes is reduced to zero. Moreover, the low-temperature liquefied combustible gas is stored, free of loss, in the first storage tank, and an enrichment of the low-temperature liquefied combustible gas with higher-boiling constituents is avoided.

The apparatus according to the invention is advantageously used in a vehicle so that the heat required for the phase transition of the combustible gas is extracted from the refrigeration space, in particular by means of an evaporator arranged outside of the refrigeration space and a secondary heat exchange loop. When the vehicle is in operation, the low-temperature liquefied combustible gas is extracted from the first storage tank from the liquid phase, initially evaporated, employed for cooling the refrigeration space and supplied only thereafter to the internal combustion engine. Thus, during operation, less or no liquid nitrogen has to be supplied to the refrigeration space, with the result that the efficiency of the refrigeration vehicle is further increased. However, a cooling of the refrigeration space by low-temperature liquefied combustible gas and liquid nitrogen is also possible, depending on the refrigeration requirements. The use of a secondary heat exchange loop is desirable for safety reasons. In the prior art it is known to conduct the combustible gas through an evaporator located in the refrigeration space, what is practicable, efficient, but bears some risks in case of a leakage. An evaporator outside the refrigeration space connected to a secondary heat exchange loop, which transports the heat from the refrigeration space to the evaporator, can completely avoid the risk that combustible gas enters the refrigeration space in case of any leakage or other failure of the system. It also allows a more flexible local arrangement of the evaporator and shorter fuel supply lines.

According to yet a further aspect of the invention, the use of the apparatus according to the invention in a filling station unit is proposed, in particular for carrying out the method according to the invention.

At filling stations according to the invention, liquid nitrogen, as well as low-temperature liquefied combustible gas, is offered for filling refrigeration vehicles. The combustion of a first storage tank, in which low-temperature liquefied combustible gas is stored, and of a second storage tank, in which liquid nitrogen is stored, makes it possible to configure the storage of the low-temperature liquefied gas more efficiently, since evaporating combustible gas no longer occurs. Enrichment with more difficultly volatile elements, such as, in particular, propane in natural gas, is thus efficiently prevented. However, this, in turn, also makes it possible at such filling stations which, for example, have pressure tanks for combustible gas to fill vehicles with a constant mixture of constituents. For this purpose, only one additional pressure tank for natural gas has to be provided, which is fed from the first storage tank for low-temperature combustible gas, specifically from the liquid phase of the latter. Thus, a multi-purpose filling station can be obtained, which delivers liquid nitrogen and liquid or pressurized combustible gas always having an identical composition. In this case, the liquid fuel gas either may be compressed in liquid form by means of a pump and be added to the vehicle as high-pressure gas or is conducted into a pressure tank of the filing station, in order, closed off there, to be brought to a high pressure by the supply of heat. In the latter case, a high-pressure filling station may be operated without any compressor.

The details and advantages disclosed for the apparatuses according to the invention can be transferred and applied to the method according to the invention, and vice versa.

BRIEF DESCRIPTION OF THE FIGURES

The invention and the technical context are explained below, by way of example, by means of the figures. It should be pointed out that the figures show especially preferred design variants of the invention, which, however, is not restricted to these. In the diagrammatic figures.

DETAILED DESCRIPTION OF THE INVENTION

Figure 1:
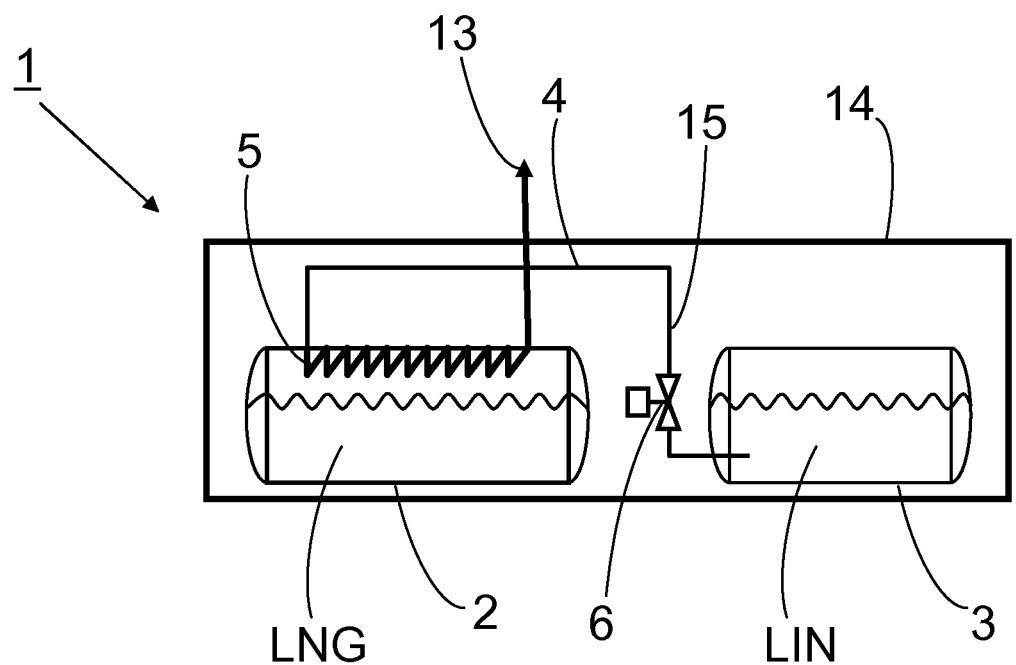
FIG. 1 shows the principles of a storage apparatus according to the invention.

FIG. 1 shows diagrammatically an apparatus 1 according to the invention with a first tank 2 for low-temperature liquefied combustible gas LNG, and with a second tank 3 for liquid nitrogen LIN, and also a connection element 4. The connection element 4 has a line system 15, a heat exchanger 5 and a valve 6. The first storage tank 2 and the second storage tank 3 are arranged in a common insulating jacket 14. The connection element 4 is arranged so that, during operation, heat is extracted from the low-temperature liquefied combustion gas LNG in the first storage tank 2 by the liquid nitrogen LIN in the second storage tank 3, so that the low-temperature liquefied combustible gas LNG in the first storage tank 2 is cooled.

An evaporation of the low-temperature liquefied combustible gas LNG on account of the supply of heat from the surroundings is thus prevented. In order to ensure a desired transmission of heat from the low-temperature liquefied combustible gas LNG to the nitrogen LIN, the heat exchanger 5 is arranged in the first storage tank 2. The quantity of nitrogen supplied to the heat exchanger 5 is regulated so that the temperature of the low-temperature liquefied gas LNG is kept below the boiling point of all the constituents, which temperature amounts, in the case of a pressureless storage of natural gas, to $-161°$ C. The nitrogen routed for cooling through the connection element 4 is subsequently supplied to the surroundings or to another use through a nitrogen outlet 13. The apparatus 1 according to the invention prevents an enrichment of the low-temperature liquefied combustible gas LNG by non-volatile constituents.

In an embodiment, not illustrated, of the apparatus 1, in each case a heat exchanger 5 may be provided both in the first storage tank 2 and in the second storage tank 3, which heat exchangers are connected via a line system 15. In the heat exchanger system thus formed, a heat transfer medium circulates, which still remains flowable even at temperature of liquid nitrogen and which has a boiling point of markedly above $50°$ C. The heat transfer medium is usually commercially available oils and the like.

Figure 2:
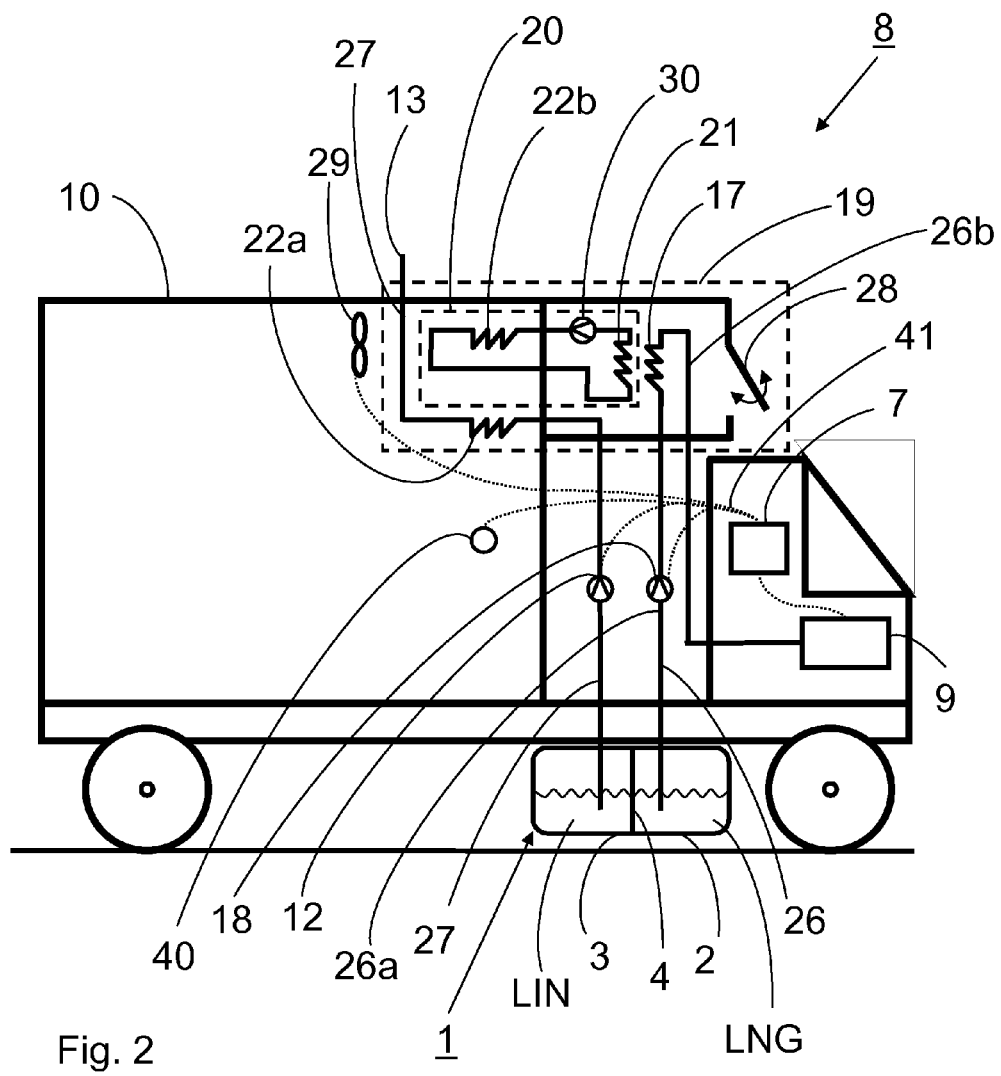
FIG. 2 shows schematically a refrigeration vehicle with an apparatus according to the invention.

FIG. 2 shows schematically the use of an apparatus 1 according to the invention in a motor vehicle 8 with a refrigeration space 10 and with an internal combustion engine 9. The apparatus 1 according to the invention has a first storage tank 2 and a second storage tank 3 which are arranged in a common holding device. The first storage tank 2 and the second storage tank 3 are connected with a heat-transmitting connection element 4, via which the low-temperature liquefied gas LNG in the first storage tank 2 can be cooled by the liquid nitrogen LIN from the second storage tank 3. The nitrogen evaporated during cooling can directly escape into the atmosphere via a nitrogen outlet 13 or can be used for the further cooling of the refrigeration space 10.

The liquid part of the medium in the first storage tank 2 can be conducted via a fuel pump 18 into the evaporator 17. The liquid part of the medium in the second storage tank 3 can be conducted via a nitrogen pump 12 into a first refrigeration space cooler 22 a. Alternatively the intrinsic pressure of the media in the tanks 2, 3 can be used for conduction. A refrigeration unit 19 cools the refrigeration space 10, in that heat of the refrigeration space 10 is extracted via the first refrigeration space cooler 22a and/or the second refrigeration space cooler 22b. Other known methods for cooling a refrigeration space by means of nitrogen may, of course, also be employed in parallel or alternatively.

When the internal combustion engine 9 is in operation, the low-temperature liquefied gas LNG is extracted from the first tank 2 with the fuel pump 18 and is supplied to the refrigeration unit 19 via heat insulated fuel lines 26a.

In the refrigeration unit 19, heat is extracted from the air in the refrigeration space 10 via a secondary heat exchange loop 20, comprising a heat exchange loop heat exchanger 21, a second refrigeration space cooler 22b as well as a coolant pump 30, and the evaporator 17, with the result that a phase transition of the combustible gas from liquid to gaseous takes place in the evaporator 17. If more heat is required for evaporating the low temperature natural gas LNG in the evaporator 17, for example when the set temperature in the refrigeration space 10 is reached, warm ambient air can be supplied to the evaporator 17 by opening a closable air flap 28. A fan 29 ensures a circulation of the cooled air in the refrigeration space 10. The combustible gas, which is now gaseous after the phase transition, is supplied to the internal combustion engine 9 being operated by the combustible gas via fuel lines 26b.

The low-temperature liquefied combustible gas LNG is cooled via the heat-transmitting connection element 4 by the liquid nitrogen LIN so that essentially no low-temperature liquefied combustible gas LNG evaporates. If the internal combustion engine 9 is not in operation, liquid nitrogen LIN can be supplied via the nitrogen line 27 to the first refrigeration space cooler 22a as cooling medium to the refrigeration unit 19. For this purpose, the liquid nitrogen LIN is extracted from the second storage tank 3 by means of intrinsic pressure or via the nitrogen pump 12.

A regulation unit 7 is installed on the vehicle 8 to ensure a coordinated activation, regulation and control of the steering elements of the system. For this purpose the regulation unit 7 is in particular connected via steering lines 41 to the internal combustion engine 9, the nitrogen pump 12, the fuel pump 18, the fan 29 and the coolant pump 30 as well as to sensors 40 for gathering the current temperature in the refrigeration space 10. The regulation unit 7 evaluates the available information and then adjusts the parameters of operation of the corresponding steering elements. The steering routine of the regulation unit 7 is adapted to ensure, that the low-temperature liquefied combustible gas LNG is completely evaporated and heated up to a certain temperature before it is supplied to the internal combustion engine 9. Moreover the regulation unit 7 ensures, that the coolant circulates in the secondary heat exchange loop 20 as soon as the internal combustion engine 9 is running and the heat from the refrigeration space 10 is needed for evaporation of the low-temperature liquefied combustible gas.

Figure 3:
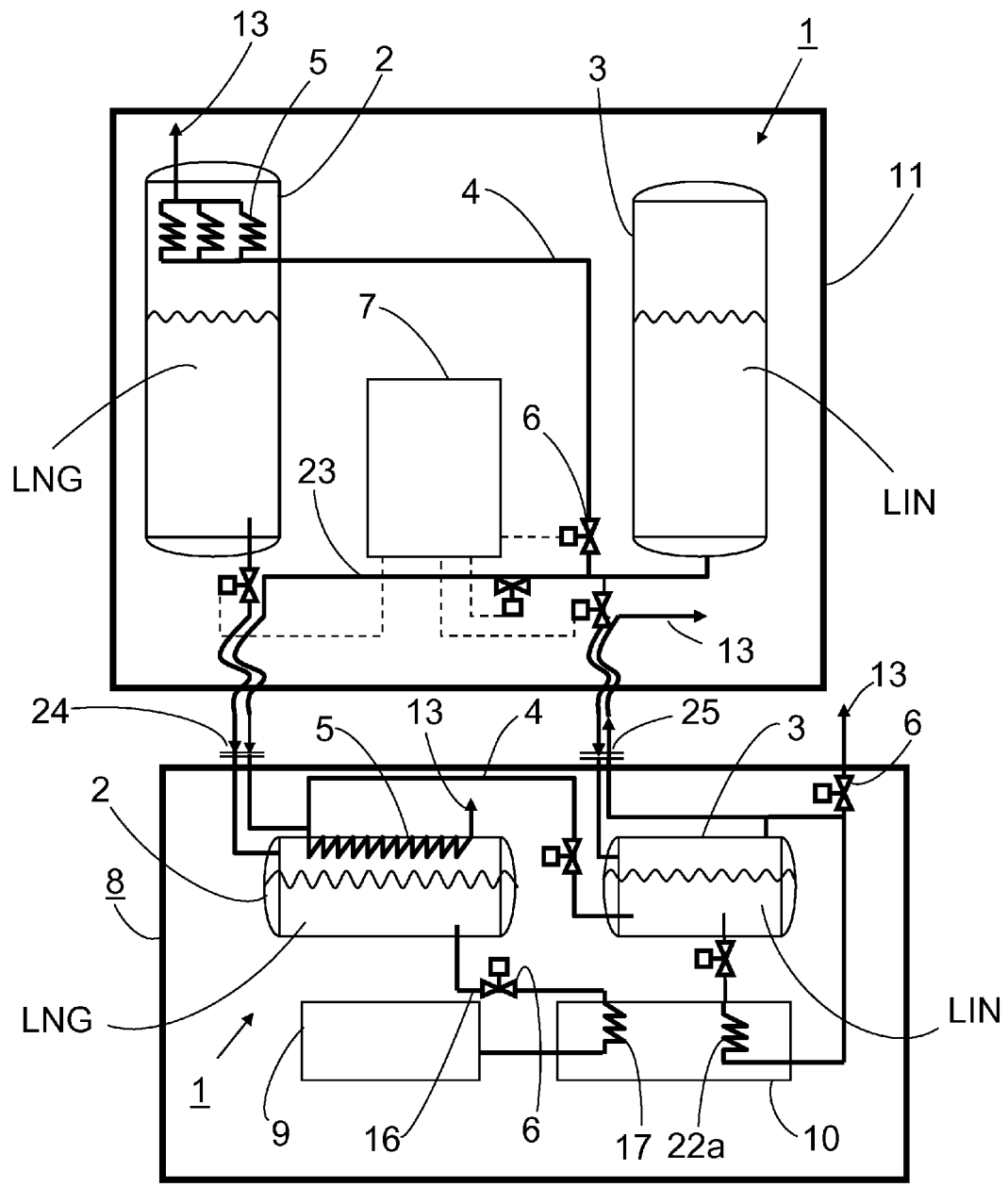
FIG. 3 shows schematically a storage system of a vehicle and a filling station unit, each with an apparatus according to the invention.

FIG. 3 shows schematically a storage system of a vehicle 8 with an apparatus 1 according to the invention during a filling operation at a filling station unit 11 with an apparatus 1 according to the invention. The motor vehicle 8 comprises, in addition to the apparatus 1 according to the invention with a first storage tank 2, with a second storage tank 3 and with a connection element 4, an internal combustion engine 9 and a refrigeration space 10. The low-temperature liquefied combustible gas LNG stored in the first storage tank 2 is not supplied directly to the internal combustion engine 9 via lines 16, but, instead, is delivered first to the refrigeration space 10 and only thereafter to the internal combustion engine 9. When being routed through the refrigeration space 10, the low-temperature liquefied combustible gas LNG can be routed through a heat exchanger, in particular an evaporator 17 if the low temperature liquefied combustible gas needs to be supplied gaseous to the internal combustion engine 9. This allows an efficient transmission of heat from the air in the refrigeration space 10 to the low-temperature combustible gas LNG. Alternatively a secondary heat exchange loop 20, which is not shown in the figure, might be installed for extracting the heat from the refrigeration space 10 and for increasing the safety of the system.

The liquid nitrogen LIN stored in the second storage tank 3 can be employed for cooling the first storage tank 2 having the low-temperature liquefied combustible gas LNG via a heat exchanger 5 and/or for cooling the refrigeration space 10 via a first refrigeration space cooler 22a. An efficient heat transmission is provided in each case. In both cases, the spent nitrogen passes into the atmosphere via the nitrogen outlets 13. As a result of the cooling of the low-temperature liquefied combustible gas LNG by liquid nitrogen LIN, an evaporation of the more volatile constituents of the low-temperature liquefied combustible gas LNG is prevented, so that enrichment with less volatile constituents of the gas is prevented. Moreover, when the internal combustion engine 9 is at a standstill, a cooling of the refrigeration space 10 can also take place via the supply of liquid nitrogen LIN, so that no environmentally harmful gases from the low-temperature liquefied combustible gas LNG pass into the atmosphere or have to be intermediately stored.

The filling station unit 11 comprises, in addition to the apparatus 1 according to the invention with a first storage tank 2 for a low-temperature liquefied combustible gas LNG and with a second storage tank 3 for liquid nitrogen LIN and with a connection element 4, a regulation unit 7 which is connected to valves 6 of the connection element 4. Via the regulation unit 7, which, moreover, may be connected to an analog regulation unit of the motor vehicle 8, both the operation of filling the motor vehicle 8 and the storage of the low-temperature liquefied combustible gas LNG in the first storage tank 2 can be regulated. If a filling operation is not taking place at the filling station unit 11, the regulation unit 7 regulates mainly the temperature and, if appropriate, the pressure in the first storage tank 2. The regulation unit 7 monitors the temperature and/or pressure in the first storage tank 2 by means of measuring instruments, not illustrated. After comparison with stipulatable parameters, the regulation unit 7 supplies nitrogen or heat transfer medium to the first storage tank 2 via controllable valves, until the stipulatable parameters are achieved. During a filling operation, the regulation unit 7 regulates the quantities of liquid nitrogen LIN and/or low-temperature liquefied combustible gas LNG supplied to the vehicle 8, the regulation unit 7 at the same time counteracting a possible temperature rise or pressure drop in the first storage tank 2 of the filling station unit by the supply of heat transfer medium. Moreover the routines of the regulation unit 7 comprise an operation mode enabling a boil-off free transfer of low-temperature liquefied combustible gas LNG and/or liquid nitrogen LIN via the couplings 24, 25, from the corresponding storage tanks of the filling unit 11 to the storage tanks of the vehicle 8, solely by regulating pressure and temperature of the low-temperature liquefied combustible gas LNG.

It is particularly advantageous if, when the vehicle 8 is being filled with liquid combustible gas LNG, a simultaneous cooling by liquid nitrogen LIN takes place. For this purpose, a connection line 23 is provided, through sections of which the latter is routed parallel to the filling line in order to cool the latter. It is especially beneficial to have a version of the filling system with a first double coupling 24, by means of which a connection for liquid combustible gas LNG and for liquid nitrogen LIN can be made simultaneously. During filling, the filling line and the first storage tank 2 of the vehicle 8 can thereby be cooled by nitrogen from the filling station unit 11, the stock of liquid nitrogen LIN in the vehicle 8 not being spent. The filling line for liquid nitrogen LIN may also be designed to be double and be equipped with a second double coupling 25. This allows the return of gaseous nitrogen out of the second storage tank 3 of the vehicle 8 through the filling line. Each of the double couplings 24, 25 can also be designed as two single couplings.

In the exemplary embodiment of the filling station unit 11, an effective loss-free storage of low-temperature liquefied combustible gas LNG which is not enriched by more difficultly volatile constituents of the gas is also achieved for filling stations. The filling station unit 11 likewise makes it possible to have loss-free and pump-free filling of the combustible liquid gas LNG into the first storage tank 2 of the vehicle 8. This is achieved by means of the suitable addition of liquid nitrogen LIN through the connection line 23 by means of the regulation unit 7. Instead of too high a pressure, possibly occurring in the first storage tank 2 of the vehicle 8, being relieved into the atmosphere, the said tank is cooled to a value below the pressure of the first storage tank 2 of the filling station unit 11 and can then be filled, free of loss, with the intrinsic pressure of the medium.

Figure 4:
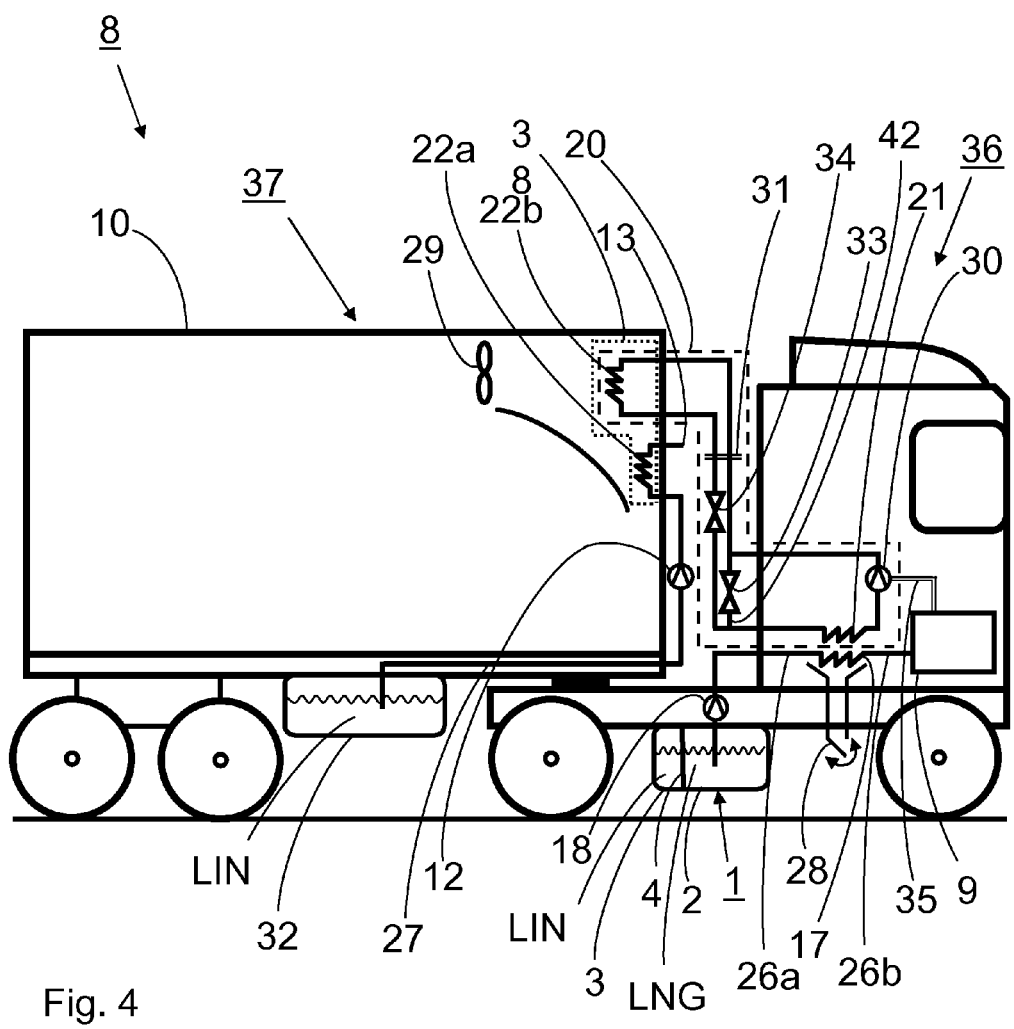
FIG. 4 shows schematically another embodiment of the invention in a refrigeration trailer.

FIG. 4 shows schematically another embodiment of the invention in a refrigeration vehicle 8 comprising a tractor 36 and a semi trailer 37, which can be separated. The tractor 36 comprises a first storage tank 7 for low-temperature liquefied combustible gas LNG, preferentially natural gas. The low-temperature liquefied combustible gas LNG can be conducted via heat insulated fuel lines 26a and optionally a fuel pump 18, if the liquefied combustible gas is not stored under pressure, into an evaporator 17 for evaporating. After a phase transition in the evaporator 17 the now gaseous combustible gas can be conducted via fuel lines 26b into an internal combustion engine 9, which can be operated with combustible gas. The semi-trailer 37 comprises a refrigeration space 10, which can be cooled by a second refrigeration unit 38, composed of a second refrigeration space cooler 22b and a first refrigeration space cooler 22a and a fan 29 for circulating the air in the refrigeration space 10, whereby the air is conducted through the second refrigeration unit 38. The second refrigeration unit 38 cools the refrigeration space 10, in that heat of the refrigeration space 10 is extracted via the second refrigeration space cooler 22b and/or the first refrigeration space cooler 22a.

The first refrigeration space cooler 22a is the essential part of a nitrogen cooling system in the refrigeration space 10 of the semi-trailer 37 comprising an insulated third storage tank 32 for liquid nitrogen LIN, nitrogen lines 27, optionally a nitrogen pump 12, if the liquid nitrogen is not stored under pressure, and a nitrogen outlet 13. The liquid nitrogen LIN can be piped via the nitrogen pump 12 through the nitrogen lines 27 into the first refrigeration space cooler 22a in the refrigeration space 10, in which the liquid nitrogen LIN is evaporated and the heat required for warming up the liquid nitrogen LIN and its phase transition is taken from the refrigeration space 10, by what the desired indirect cooling power is achieved. After the evaporation the nitrogen can be emitted to the environment via the nitrogen outlet 13. Other known methods for cooling a refrigeration space with nitrogen can be used in parallel or alternatively to the one mentioned. Moreover, a simultaneous use of a conventional compressor based cooling circuit is possible.

Furthermore the refrigeration space 10 of the semi-trailer 37 can be cooled indirectly by extracting its heat with the second refrigeration space cooler 22b of the second refrigeration unit 38 via a secondary heat exchange loop 20 by leading the heat into a heat exchange loop heat exchanger 21, which is located in the tractor 36 close to the evaporator 17 for the low-temperature liquefied combustible gas LNG, with the result that the phase transition of the combustible gas from liquid to gaseous takes place in the evaporator 17. The secondary heat exchange loop 20 moreover comprises a coolant circulating in the heat exchange loop 20, by means of being driven by a coolant pump 30. The heat exchange loop 20 in addition comprises flexible lines 39 as well as detachable couplings 31, which enable the disconnection of the secondary heat exchange loop 20, if the tractor 36 and the semi-trailer 37 are separated, whereby for increasing safety and practicability these two parts of the heat exchange loop 20 are sealed by reconnecting the elements of the detachable couplings 31 on each vehicle part 36, 37, so that two smaller loops are generated. The detachable couplings 31 are designed in such a way, that in case of disconnecting all ends are automatically sealed simultaneously and thus no losses of coolant can occur. The coolant pump 30 is mounted on the tractor 36 and is preferentially directly operated by the internal combustion engine 9 by using a mechanic pump drive 35, for example a vee-belt.

If more heat is required for evaporating the low temperature liquefied combustible gas LNG in the evaporator 17, for example if the set temperature of the refrigeration space 10 is reached, warm ambient air can be supplied to the evaporator 17 by opening a closable flap 28. The closable air flap 28 can be mounted in a way, that the ambient air imbibes rejected heat of the internal combustion engine 9 and afterwards supplies this additional heat to the evaporator 17, therefore even if the ambient air is not warm enough for supporting an efficient evaporation of the low-temperature combustible gas LNG in the evaporator 17 a sufficient amount of heat is available. Another case when this additional heat rejected from the internal combustion engine 9 might be needed is, when the refrigeration space 10 contains chilled food requiring a temperature above the temperature of the surrounding, for example in winter, when chilled food is transported not being capable of temperature below a certain set value. Commonly a regulation unit being connected to the mentioned elements of the heat exchange loop 20 and to corresponding sensors not included to the figure will be installed on the refrigeration vehicle 8 for controlling the different modes of operation and to ensure a sufficient supply of heat or cold to the refrigeration space 10 and a sufficient amount of heat to the evaporator 17 to avoid applying fluid combustible gas LNG to the internal combustion engine 9.

The line system of the heat exchange loop 20 moreover comprises a bypass-connection 42 to bypass the second refrigeration cooler 22b and the detachable couplings 31. For the regulation of the coolant flow, a bypass valve 33 is included in the bypass connection 42 which is inserted parallel to the couplings 31 and parallel to the second refrigeration cooler 22b on the tractor 26. The bypass connection 42 provides a loop only consisting of the heat exchange loop heat exchanger 21 the coolant pump 30 and the bypass valve 33, if the bypass valve 33 is opened and a switching valve 34, being inserted in a row with the heat exchange loop heat exchanger 21, is closed. The switching valve 34 is mounted in such a way, that the heat exchange loop heat exchanger 21 is, in case of a closed switching valve 34 and an opened bypass valve 33, still passed through with circulating coolant for not freezing. The bypass connection 42 is applied, when the refrigeration space 10 does not require any cooling because its set temperature is reached. The bypass valve 33 is also opened, if the two vehicle parts 36, 37 are disconnected and thus the corresponding couplings 31 between the vehicle parts 36, 37 are detached. The heat required for the evaporation of the low-temperature liquefied combustible gas LNG in the evaporator 17 is in case of bypassing the second refrigeration cooler 22b, hence opened bypass valve 33 and closed switching valve 34, supplied by air being conducted through the closeable air flap 28. In particular, freezing of the heat exchange loop heat exchanger 21, which might occur if not enough coldness is taken from the low-temperature liquefied combustible gas LNG for being conducted to the refrigeration space 10, is avoided, because it is warmed by the air delivered by opening the air flap 28.

The refrigeration room cooling, using the secondary heat exchange loop 20 as mentioned before is preferably used when the internal combustion engine 9 of the vehicle 8 is in use, because in this case gaseous combustible gas LNG is required in the internal combustion engine 9 and the synergistic effects of the process can be fully utilized. In case of not operating the internal combustion engine 9 or when the tractor 36 and the semi-trailer 37 are separated and simultaneously a cooling of the refrigeration space 10 is necessary, the required cold can be supplied by the liquid nitrogen LIN cooling method as described. In this way an extraordinary effective technique for distributing the available forms of energy can be realized, and therefore in particular the consumption of liquid nitrogen LIN in a refrigeration truck can be minimized. Even if the energy extracted from the refrigeration space 10 for evaporation of the low-temperature liquefied combustible gas LNG is not sufficient to reach a given set temperature in the refrigeration space 10, the liquid nitrogen cooling method can be used simultaneously. For a further reduction of nitrogen consumption, especially if cooling powers of liquid nitrogen LIN and low-temperature liquefied gas LNG are combined, the first refrigeration space cooler 22a is arranged behind the heat exchange loop heat exchanger 21 according to the fan 29 in the second refrigeration unit 38, so that the air circulating in the refrigeration space 10 firstly flows through the heat exchange loop heat exchanger 21.

The tractor 36 is additionally equipped with a boil-off apparatus 1 according to the invention, which enables a connection of the first storage tank 2 to a second storage tank 2 for liquid nitrogen LIN via a heat-transmitting connection element 4. The boil-off apparatus 1 hereby enables an exceptionally effective joint storage and/or transport of low-temperature liquefied combustible gas LNG and liquid nitrogen LIN, because the low-temperature liquefied combustible gas LNG can be cooled directly or indirectly with the liquid nitrogen LIN in the second storage tank 3. An evaporation of the low-temperature liquefied combustible gas LNG on account of the supply of heat from the surroundings is thus prevented. Moreover, the boil-off apparatus 1 ensures that the temperature of the low-temperature liquefied combustible gas LNG in the first storage tank 2 is kept below the boiling point of all the constituents, which temperature amounts, in the case of a pressureless storage of natural gas, to −161° C. Thus, an enrichment of constituents of the low-temperature liquefied combustible gas LNG, possessing a relatively high boiling point, in the first storage tank 2 can be avoided. Following especially a potentially damaging increase of the part of propane in the low-temperature liquefied combustible gas LNG can be obviated.

The embodiment shown in FIG. 4 is especially suitable for refrigeration transporters operated with natural gas, which are used for the distribution of frozen and chilled goods to retail dealers. In particular the economic employment of a combustion engine operated with natural gas in a trailer truck, storing the natural gas in the liquid phase, and the combined use of this cold for cooling a refrigeration space is highly advantageous, because the amount of energy needed all in all can be explicitly lowered.

The present invention allows loss-free storage and/or transportation of low-temperature liquefied combustible gas LNG, prevents an enrichment of the low-temperature liquefied combustible gas with higher-boiling constituents of the gas and thus increases the efficiency of the storage and transport of the low-temperature liquefied combustible gas LNG. It is especially advantageous to apply the invention to refrigeration transporters, for example in the delivery of refrigerated merchandise to retailers.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE SYMBOLS

1 Apparatus
2 First storage tank

3 Second storage tank
4 Heat-transmitting connection element
5 Heat exchanger
6 Valve
7 Regulation unit
8 Vehicle
9 Internal combustion engine
10 Refrigeration space
11 Filling station unit
12 Nitrogen pump
13 Nitrogen outlet
14 Insulating jacket
15 Line system
16 Lines
17 Evaporator
18 Fuel pump
19 Refrigeration unit
20 Secondary Heat exchange loop
21 Heat exchange loop heat exchanger
22a First refrigeration space cooler
22b Second refrigeration space cooler
23 Connection line
24 First double coupling
25 Second double coupling
26a Heat insulated fuel lines
26b Fuel lines
27 Nitrogen line
28 Closable air flap
29 Fan
30 Coolant pump
31 Coupling
32 Third storage tank
33 Bypass valve
34 Switching valve
35 Mechanic pump drive
36 Tractor
37 Semi-trailer
38 Second refrigeration unit
39 Flexible lines
40 Sensors
41 Steering lines
42 Bypass Connection
LIN Liquid nitrogen
LNG Liquid natural gas

What is claimed is:

1. A refrigeration vehicle comprising:
a refrigeration space for the transport of a frozen or chilled stock;
an engine driven by a liquefied combustible gas;
a supply station including:
at least one first storage tank for storing the liquefied combustible gas;
at least one second storage tank for storing a liquid nitrogen; and
at least one heat-transmitting connection element, between the at least one first storage tank and the at least one second storage tank, adapted and configured to cool or maintain the liquefied combustible gas at a temperature below a boiling point of the liquefied combustible gas, directly or indirectly by the liquid nitrogen;
a refrigeration unit linked to the refrigeration space for cooling the refrigeration space, a first refrigeration space cooler and a second refrigeration space cooler being disposed within the refrigeration unit;
an evaporator fluidly communicating between the engine and said at least one first storage tank and being adapted and configured to vaporize the liquefied combustible gas to provide the combustible gas to the engine;
a heat exchange loop containing a heat transfer medium circulating therethrough by a heat transfer medium pump, the second refrigeration space cooler forming part of the heat exchange loop within the refrigeration space;
a heat exchange loop heat exchanger forming part of the heat exchange loop and coupling to the evaporator to exchange heat with the evaporator for vaporization of the liquefied combustible gas;
a liquefied combustible gas pump fluidly communicating between said at least one first storage tank and the evaporator; and
a nitrogen pump fluidly communicating between the first refrigeration space cooler and said at least one second storage tank and being adapted and configured to pump liquid nitrogen from said at least one second storage tank to the first refrigeration space cooler,
wherein heat of the refrigeration space is extracted via one or both of the first refrigeration space cooler and the second refrigeration space cooler.

2. The refrigeration vehicle of claim 1, wherein the liquefied combustible gas is natural gas.

3. The refrigeration vehicle of claim 1, wherein the second storage tank is arranged in the first storage tank.

4. The refrigeration vehicle of claim 1, wherein the first storage tank and the second storage tank are arranged in a common insulating jacket.

5. The refrigeration vehicle of claim 1, wherein the at least first storage tank and the at least second storage tank are connected by a heat-transmitting connection element.

6. The refrigeration vehicle of claim 5, wherein the heat-transmitting connection element has at least one heat exchanger.

7. The refrigeration vehicle of claim 1, wherein the evaporator is placed at an end of the refrigeration unit away from the refrigeration space.

8. A method for the refrigerated transportation of a frozen or chilled stock in a vehicle having:
a refrigeration space for the transport of said stock,
a supply station for storing a liquefied combustible gas in at least one first storage tank and liquid nitrogen in at least one second storage tank, respectively,
a refrigeration unit linked to the refrigeration space for cooling the refrigeration space, a first refrigeration space cooler and a second refrigeration space cooler being disposed within the refrigeration unit,
an engine driven by a combustible gas,
an evaporator fluidly communicating between the engine and said at least one first storage tank and being adapted and configured to vaporize the liquefied combustible gas to provide the combustible gas to the engine,
a heat exchange loop containing a heat transfer medium circulating therethrough by a heat transfer medium pump, the second refrigeration space cooler forming part of the heat exchange loop within the refrigeration space,
a heat exchange loop heat exchanger forming part of the heat exchange loop and coupling to the evaporator to exchange heat with the evaporator for vaporization of the liquefied combustible gas;
a liquefied combustible as pump fluidly communicating between said at least one first storage tank and the evaporator, and
a nitrogen pump fluidly communicating between the first refrigeration space cooler and said at least one second storage rank and being adapted and configured to pump liquid nitrogen from said at least one second storage tank to the first refrigerated space cooler, said method comprising the steps of:

when needed, cooling the liquefied combustible gas, or maintaining a temperature of the liquefied combustible gas below a boiling point of the liquefied combustible gas, directly or indirectly by the liquid nitrogen; and withdrawing heat from the refrigerated space by one or both of the first refrigeration space cooler and the second refrigeration space cooler, wherein:

heat is withdrawn from the refrigeration space by the first refrigeration space cooler by pumping the liquid nitrogen with the nitrogen pump to the first refrigeration space cooler and exchanging heat, via the first refrigeration space cooler, between the pumped liquid nitrogen and an ambient atmosphere within the refrigeration space to vaporize the pumped liquid nitrogen, a heat of vaporization of the pumped liquid nitrogen coming from all or a portion of the heat withdrawn from the refrigeration space by the first refrigeration space cooler, and heat is withdrawn from the refrigeration space by the second refrigeration space cooler by pumping the liquefied combustible gas from said at least one first storage tank in the supply station to the evaporator in the refrigeration unit by the liquefied combustible gas pump, circulating the heat transfer medium through the heat exchange loop with the heat transfer medium pump, and exchanging heat, via the heat exchanging loop heat exchanger and the evaporator, between the heat transfer medium and the liquefied combustible gas so as to vaporize the liquefied combustible gas for driving the engine, a heat of vaporization of the liquefied combustible gas coming from all or a portion of the heat withdrawn from the refrigeration space by the second refrigeration space cooler.

9. The method of claim 8, further comprising the step of: regulating heat extracted by the liquefied combustible gas.

10. The method of claim 8, further comprising the step of: transmitting heat from the liquefied combustible gas to the liquid nitrogen via at least one heat exchanger in the supply station.

11. The method of claim 8, further comprising the steps of: supplying the combustible gas to the engine; and extracting heat required for the vaporization of the liquefied combustible gas from the refrigeration space.

12. The method of claim 11, wherein the step of extracting the heat required for the vaporization of the liquefied combustible gas includes the step of extracting the heat required for the vaporization of the liquefied combustible gas from the refrigeration space via the heat exchange loop.

13. The method of claim 8, further comprising the step of supplying the liquid nitrogen from the at least one second storage tank or from a third storage tank to the second refrigeration space cooler for cooling the refrigeration space.

14. The method of claim 8, further comprising the steps of when the engine is in operation:

extracting the liquefied combustible gas from the at least one first storage tank in liquid phase;
evaporating the liquefied combustible gas;
employing heat of evaporation for cooling the refrigeration space; and
employing the liquid nitrogen for cooling the refrigeration space as necessary.

15. The method of claim 8, further comprising steps of when the engine is not in operation:

employing the liquid nitrogen as necessary to cool the liquefied combustible gas or to maintain the liquefied combustible gas below the boiling point of the liquefied combustible gas; and
employing the liquid nitrogen and/or the liquefied combustible gas for cooling the refrigeration space as necessary.

16. The method of claim 8, wherein the liquefied combustible gas is natural gas.

17. A method for equipping a vehicle for the refrigerated transportation of a frozen or chilled stock in the vehicle having a refrigeration space for the transport of said stock and an engine driven by a combustible gas, the method comprising the step of providing the vehicle with:

a supply station comprising at least one first storage tank adapted and configured to store a liquefied combustible gas, at least one second storage tank adapted and configured to store liquid nitrogen, and a heat-transmitting connection element connecting, and in heat transfer communication between, said at least one first storage tank and said at least one second storage tank; and a refrigeration unit comprising:

a) a first refrigeration space cooler in heat transfer relation with the refrigeration space being adapted and configured to withdraw heat from the refrigeration space,
b) a second refrigeration space cooler in heat transfer relation with the refrigeration space being adapted and configured to withdraw heat from the refrigeration space,
c) an evaporator fluidly communicating between the engine and said at least one first storage tank and being adapted and configured to vaporize liquefied combustible gas pumped from said at least one first storage tank to provide the combustible gas for driving the engine,
d) a hear exchange loop including a heat transfer medium pump, the second refrigeration space cooler forming a part of the heat exchange loop within the refrigeration space, the heat exchange loop being adapted and configured to allow a heat transfer medium circulating therethrough by the heat transfer medium pump, wherein the second refrigeration space cooler is adapted and configured to exchange heat between an ambient atmosphere in the refrigeration space and the heat transfer medium circulating through the heat exchange loop,
e) a heat exchange loop heat exchanger forming part of the heat exchange loop and coupling to the evaporator to exchange heat with the evaporator for vaporization of the liquefied combustible gas,
f) a liquefied combustible gas pump fluidly communicating between said at least one first storage tank and the evaporator and being adapted and configured to pump the liquefied combustible gas from said at least one first storage tank to the evaporator, and
g) a nitrogen pump fluidly communicating between the first refrigeration space cooler and said at least one second storage tank and being adapted and configured to pump liquid nitrogen from said at least one second storage tank to the first refrigeration space cooler, the first refrigeration space cooler being adapted and configured to exchange heat between an ambient atmosphere in the refrigeration space and liquid nitrogen pumped by the nitrogen pump so as to vaporize the pumped liquid nitrogen, wherein the refrigeration unit is adapted to withdraw heat from the refrigeration space by one or both of the first refrigeration space cooler and the second refrigeration space cooler.

18. The method of claim 17, further comprising the step of: connecting the at least one first storage tank to the at least one second storage tank with the heat-transmitting connection element configured to cool the liquefied combustible gas by the liquid nitrogen.

19. The method of claim 17, further comprising the step of: installing a heat exchanger in the heat-transmitting connection element extended into the at least one first storage tank.

* * * * *